United States Patent [19]

Zinn

[11] 4,399,319

[45] Aug. 16, 1983

[54] THERMALLY INSULATED COMPOSITE FLEXIBLE HOSE

[75] Inventor: Michael F. Zinn, Ellenville, N.Y.

[73] Assignee: Bio-Energy Systems, Inc., Ellenville, N.Y.

[21] Appl. No.: 322,669

[22] Filed: Nov. 18, 1981

[51] Int. Cl.³ .................... F16L 11/04; F16L 11/12
[52] U.S. Cl. .................................. 174/47; 138/111; 174/95
[58] Field of Search ............... 174/47, 95, 97, 110 F; 98/DIG. 7; 138/111, 115, 116, 117; 137/375

[56] References Cited

U.S. PATENT DOCUMENTS

| | | | |
|---|---|---|---|
| 989,532 | 4/1911 | Macduffee | 174/47 |
| 1,959,302 | 5/1934 | Paige | 174/47 |
| 2,916,055 | 12/1959 | Brumbach | 138/111 |
| 3,281,571 | 10/1966 | Gilmore | 174/47 X |
| 3,400,737 | 9/1968 | Matthews et al. | 174/47 X |
| 3,747,632 | 7/1973 | Kok et al. | 138/111 X |
| 4,194,536 | 3/1980 | Stine et al. | 138/111 X |
| 4,273,070 | 6/1981 | Hoefelmayr | 138/111 X |

FOREIGN PATENT DOCUMENTS

| | | | |
|---|---|---|---|
| 1082953 | 6/1960 | Fed. Rep. of Germany | 174/95 |
| 443399 | 12/1948 | Italy | 174/95 |
| 701690 | 3/1966 | Italy | 174/95 |
| 484815 | 5/1938 | United Kingdom | 138/111 |
| 627031 | 7/1949 | United Kingdom | 138/111 |

Primary Examiner—Laramie E. Askin
Attorney, Agent, or Firm—Charles J. Brown

[57] ABSTRACT

A thermally insulated composite flexible hose, particularly suited for heat exchanger connections in building structures, comprising an outer foam jacket of thermal insulation and an inner extended unitary elastomeric extrusion comprising primary tubes spaced apart by an intermediate section separable therefrom along tear lines. The intermediate section may comprise two additional tubes smaller in diameter than the primary tubes. Insulated electrical conductors may be disposed along the outside of the unitary extrusion and inside the jacket.

12 Claims, 2 Drawing Figures

THERMALLY INSULATED COMPOSITE FLEXIBLE HOSE

BACKGROUND OF THE INVENTION

Increasing use of solar energy for water heating has prompted many innovations in the design of solar collectors and headers on the one hand and low cost heat exchangers on the other, but relatively little attention has been given to energy-efficient conduit designs for thermal transfer between them. The present invention is the result of efforts to provide a less expensive alternative to conventional rigid or flexible piping, whether plastic or metal. Various forms of foam insulation for hot waterpiping have long been known, such as sleeves installed in the field, but they are far from ideal in cost and thermal efficiency. There have been some versions of composite multi-tube foam insulated conduits, for example U.S. Pat. No. 3,747,632, but none has involved a unitary extrusion wherein primary tubes are spaced apart by an integral intermediate section separable from the primary tubes along tear lines.

SUMMARY OF THE INVENTION

Thermally insulated composite hose is provided by the invention comprising an extended unitary extrusion of elastomeric material. The extrusion itself comprises at least two spaced primary tubes and an intermediate section separably attached to the primary tubes along tear lines and holding the tubes in spaced relation. The hose also includes a jacket of foamed thermal insulation surrounding the unitary extrusion.

The principal object of the invention is to provide a composite tube for heating, ventilating and air conditioning installations in which connections are to be made between heat sources, distribution systems, storage devices or even separate building structures. The composite hose of the invention is thermally insulated from temperature extremes which otherwise cause moisture in the air to condense on the outside surface and cause dripping.

The various components of the hose can readily be exposed by stripping away the outer thermal jacket and separating the primary tubes from the intermediate section along the respective tear lines. This facilitates easy connection of the primary tubes to end fittings or nipple-type connectors where an outer circumferential clamp is to be applied about the outside of the primary tube end portion.

In a preferred embodiment the intermediate section comprises a pair of intermediate tubes which with the primary tubes form a hollow core, thus keeping heat transfer between the primary tubes to an irreducible minimum. The outer foam jacket is preferably a separate sleeve into which the extrusion, made up of the primary tubes and intermediate section, is pushed or drawn by pulling.

Figure 1:
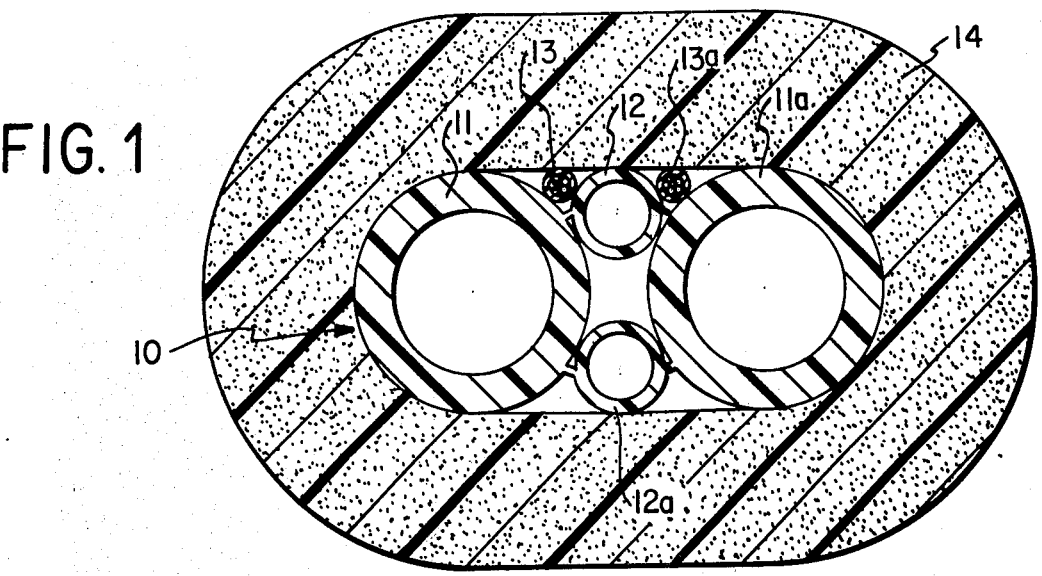
FIG. 1 is an enlarged cross section of the composite flexible hose of the invention.

Referring first to FIG. 1, the hose of the invention includes an extended unitary extrusion 10 of elastomeric material. Synthetic rubber is preferable, such as EPDM (ethylene propylene diene monomer or terpolymer), but other materials with suitable flexibility and density are satisfactory for the purpose, including polyvinyl chloride, polybutylene and so forth. The extrusion is made in extended lengths and may be stored on reels until ready for cutting to length (in perhaps 100 foot sections) and assembly with the remaining elements of the composite hose.

The extrusion 10 consists of a pair of equally sized spaced primary tubes 11 and 11A and an intermediate section comprising a pair of smaller intermediate tubes 12 and 12A. The intermediate tubes 12 and 12A serve to hold the primary tubes 11 and 11A in the correct spaced parallel relation and also to provide additional conduits in the installation for drainage, air transfer, heating purposes and the like.

Also, the intermediate tubes 12 and 12A together with the primary tubes 11 and 11A define a central hollow core coaxial with the hose structure, thus insuring minimal heat transfer between the primary tubes 11 and 11A. The hollow core also facilitates bending of the assembly because it allows the hose elements on the outside and inside of the bend to move together with minimal stretching and compression respectively to accommodated the deformation caused by bending. The movement together could not be as readily accomplished if material occupied the space between the tubes.

The intermediate tube 12 is connected on the left as shown in FIG. 1 to the primary tube 11 by a very small web of elastomeric material which easily severs when the two tubes are pulled apart. Such a web is referred to herein as constituting a tear line. A similar tear line connects the intermediate tube 12 to the primary tube 11A on the right as shown in FIG. 1, and in like manner the intermediate tube 12A is connected by respective webs or tear lines to the primary tube 11 on the left and the primary tube 11A on the right. When the primary tubes are separated from the intermediate tubes along these tear lines, the surface of each tube is substantially smooth around its circumference so that a ring clamp can be tightened about the outside of any of the tubes for attachment purposes. In many installations it is necessary to insert freed end portions of the primary tubes 11 and 11A into circular holes formed in the wall of a manifold, and this tear line feature among the primary and intermediate tubes permits such insertion to be accomplished with full sealing engagement between the primary tubes and the manifold.

The intermediate section of the extrusion 10 can take forms other than the pair of intermediate tubes 12 and 12A so long as it is separable from the primary tubes 11 and 11A along tear lines and at the same time holds the primary tubes apart in the correct spaced relation. Large separable webs could serve this purpose or a combination of webs and intermediate tubes.

The intermediate tubes 12 and 12A have an outside diameter less than one half that of the primary tubes but greater than the primary tube spacing. Typical dimensions for the primary tubes 11 and 11A are 1.156 inches in outside diameter and 0.813 inch in inside diameter. The intermediate tubes 12 and 12A may then be 0.438 inch in outside diameter and 0.313 inch in inside diameter. When the centers of the primary tubes 11 and 11A are spaced apart 1.490 inches and when each of the four webs or tear lines is about 0.005 inch in thickness, the tops of the primary tubes 11 and 11A and the intermediate tube 12 lie along a common straight line tangent and the same is true of the bottoms of the primary tubes 11 and 11A and the intermediate tube 12A.

In the assembly of the composite hose of the invention, selected lengths of the unitary extrusion are cut from a reel, for example 100 foot sections. A pair of separately insulated conductors 13 and 13A are then laid in the valleys defined between intermediate tube 12 and the primary tubes 11 and 11A. The wires themselves may be from 18 to 20 gauge with an outer coating of silicone, polyvinyl chloride or EPDM. These conductors are useful for making electrical circuits with sensors or control devices.

The extrusion 10 with the conductors 13 and 13A may then be coated with a liquid lubricant or a lubricating powder such as talc and by a suitable mechanism be pulled through an outer jacket 14 of closed cell foamed elastomeric thermal insulation. The jacket 14 is a separately formed element having a typical skin on its outside and inside surface and is oval in shape to fit closely around the extrusion 10. A gap of perhaps 0.100 inch may be left between the inside of the jacket 14 and the extrusion 10. By this construction there can be an axial movement between the jacket 14 and the extrusion 10. To aid in the assembly, the extrusion may be placed under tension so that it reduces somewhat in outer diameter, or such contraction may be accomplished by creating a vacuum within the tubes of the extrusion 10. The material of the jacket 14 may be nitrile polyvinyl chloride foam or an EPDM foam.

Figure 2:
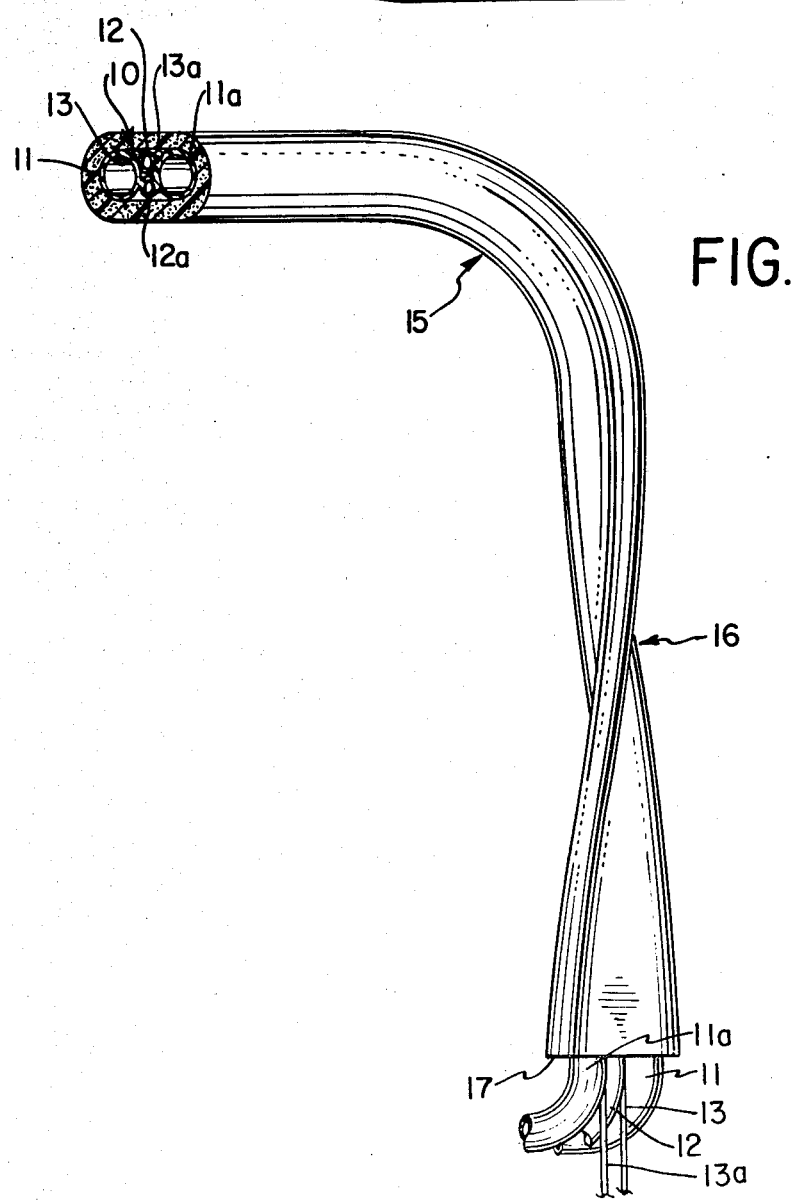
FIG. 2 shows a length of such hose bent and twisted in characteristic routing fashion with its various components stripped away at one end.

As shown in FIG. 2 the typical routing of the composite hose of the invention may require it to be bent as at 15 with its flat sides on the inside and outside of a bend and it may be twisted about itself as at 16. Whatever compound curves are required are easily accomplished because of the compressability of the various components of the hose. The neutral bending axis, i.e. that axis which does not change length in bending, remains substantially at the geometrical center line of the hose because the inner extrusion 10 and the outer foam jacket 14 stretch and compress readily as needed, especially with the hollow core formed in the center of the structure. At one end of the hose the jacket 14 may be cut as at 17 in FIG. 2 to expose the extrusion 10 and the conductors 13 and 13A. When this is done, the primary tubes 11 and 11A may be separated from the intermediate tubes 12 and 12A along the tear lines as shown in FIG. 2 for easy connection to manifolds, solar collectors, heat exchangers or any other related equipment. If the hose is directed through wall penetrations in building structures, it is suggested that suitable cuffs be provided to center the hose properly within the penetrations. It is advisable to make the tubes 11 and 11A, 12 and 12A of different colors and to do the same with the conductors 13 and 13A, so that by such coding the respective ends of each element may be identified in an installation.

The scope of the invention is not to be limited to the preferred embodiment and variations described above but instead as set forth in the following claims.

I claim:

1. Thermally insulated composite flexible hose comprising
    (a) an extended unitary extrusion of elastomeric material comprising
        i. at least two spaced primary tubes, and
        ii. an intermediate section separably attached to the primary tubes along tear lines and holding said tubes in spaced relation; and
    (b) a jacket of foamed thermal insulation surrounding said unitary extrusion.

2. Thermally insulated composite flexible hose according to claim 1 wherein a pair of equally sized parallel primary tubes are provided.

3. Thermally insulated composite flexible hose according to claim 1 wherein the intermediate section comprises at least one intermediate tube.

4. Thermally insulated composite flexible hose according to claim 1 wherein the jacket is continuous and strippable.

5. Thermally insulated flexible hose according to claim 4 wherein the jacket is a separately formed element into which the unitary extrusion is fitted.

6. Thermally insulated composite flexible hose according to claim 1 which includes insulated electrical conductor means disposed along the outside of the unitary extrusion and inside the jacket.

7. Thermally insulated composite flexible hose comprising
    (a) an extended unitary extrusion of elastomeric synthetic rubber material comprising
        i. a pair of spaced equally sized primary tubes, and
        ii. an intermediate section holding the primary tubes in parallel spaced relation, and
        iii. the two primary tubes and intermediate section being separably attached to one another along tear lines permitting the primary tubes to be free; and
    (b) a continuous strippable jacket of foamed elastomeric thermal insulation surrounding said unitary extrusion.

8. Thermally insulated composite flexible hose according to claim 7 wherein the intermediate section comprises a pair of intermediate tubes attached to the pair of primary tubes along four tear lines.

9. Thermally insulated composite flexible hose according to claim 7 which includes insulated electrical conductor means disposed along the outside of the unitary extrusion and inside the jacket.

10. Thermally insulated composite flexible hose according to claim 7 wherein the intermediate section and the primary tubes define a hollow core coaxial with a central axis of the extrusion.

11. Thermally insulated flexible hose according to claim 7 wherein the jacket is a separately formed element into which the unitary extrusion is fitted.

12. Thermally insulated composite flexible hose comprising
    (a) an extended unitary extrusion of EPDM elastomeric material having a central axis and comprising
        i. a pair of spaced equally sized primary tubes, and
        ii. a pair of spaced equally sized intermediate tubes holding the primary tubes in parallel spaced relation, and
        iii. the intermediate tubes having an outside diameter less than half that of the primary tubes but greater than the primary tube spacing, and
        iv. the four tubes being separately attached to one another along four tear lines permitting the primary tubes to be freed and together definding a hollow core coaxial with the central axis of the extrusion;
    (b) a pair of insulated electrical conductors disposed along the outside of the unitary extrusion; and
    (c) a continuous strippable jacket of closed cell foamed elastomeric thermal insulation surrounding said unitary extrusion and conductors, the jacket being a separately formed element into which the unitary extrusion is fitted.

* * * * *